Patented July 11, 1933

1,917,734

UNITED STATES PATENT OFFICE

BRUNO REWALD, OF HAMBURG, GERMANY

EXTRACTING OIL FROM SEEDS

No Drawing. Application filed October 24, 1929, Serial No. 402,302, and in Germany early in 1929.

The present invention relates to extracting oil and lecithin from seeds containing the same. Examples of such seeds are soybean, cottonseed, peanuts and the like.

Heretofore the practically universal pressing method commercially employed in the production of oils from such seeds has been to press the same hot in a hydraulic press at very high pressures. This is open to certain objections, in that while the oil may be injured only slightly, the residue is substantially injured. These seeds contain considerable amounts of proteins and the heat which is used in the pressing operation, generally between 80 and 120° C., is sufficient to render the proteins far less digestible than in the original seeds, so that the subsequent use of the presscake as a food material is injured somewhat. The proteins are in part decomposed by the high temperature and are in part hardened sufficiently to render the same either indigestible or less readily digestible.

I may call attention at this point to the fact that the lecithin present in such materials exists in two forms therein, partly free and partly as a loose (i. e. easily decomposable) chemical compound with the proteins. In accordance with the present invention it is desired to remove all of the lecithin from the material.

As a preliminary step, the seeds are preferably formed into "groats", namely small slices. Prior to this operation the hulls may be largely removed if desired, by methods already known in the art, or otherwise.

The seeds or the groats are not heated, either before or during the extraction operation, and the extraction is preferably conducted at room temperature.

The comminuted seed material may be placed in a suitable extraction or leaching device, and a mixture of benzol with 1 to 10% of ethyl or methyl alcohol is allowed to percolate through the mass, until freed from oil to the desired extent. The proportion of the alcohol in the mixture is always low, not over 10% and preferably about 5%. Amounts between about 1% and about 5% can also be used. This concentration of the alcohol does not substantially harden or reduce the digestibility of the proteins.

When the extraction has been sufficiently completed, the remaining solvent mixture is allowed to drain off, and the material is dried, for example by being allowed to fall countercurrent through a rising current of warm air or other gas, and in this operation I preferably avoid the use of temperatures higher than 50 to 60° C., or 70° C., at the maximum.

Methyl alcohol is superior to ethyl alcohol for use in this process since it has a better dissolving action. Ethyl can however be employed. The composite solvent dissolves out not only the oil but the whole of the lecithin, including the lecithin which is in the free state in the seeds, as well as that which is in the form of a loose combination with the proteins. If benzol were used as the solvent, it would not dissolve out this latter.

Methyl alcohol or ethyl alcohol used in the process should of course be pure or should be sufficiently free from impurities that it will not impart objectionable flavors or odors to the oily material or to the extracted residue. Synthetic methanol is preferred.

Ordinarily, I preferably leave one-half to one per cent of oil in the residue, since the last portions of the oil are only removed from the residue with great difficulty and for most purposes it is desired to have a small amount of oil in the residue, when the latter is to be used for feeding purposes.

The leaching or extraction can be carried out in a series of extraction batteries, with the solvent flowing through the series of batteries, coming into contact first with the material which has been most completely leached, and coming into contact finally with fresh material, whereby the quantity of solvent used for leaching will be much reduced.

I have referred above in numerous places to the use of benzol. It will be understood that it is not necessary to use chemically pure benzene, and ordinary benzol contains a mixture of benzene, toluene and the like. Toluene, xylene or mixtures of these or either of these with benzene may be employed in place of the benzol, in the proportions above referred to, that is to say the single-ring aromatic hydrocarbon is in all cases at least 10 to 20 times greater than the amount of the lower alcohol.

It will be understood that the solution of oil and lecithin in the composite solvent employed will be subjected to filtration if necessary, and then to distillation to recover the solvent for reuse.

The dried residue of the solid seed material can be directly used in cattle feed, or can be ground up to be used for various other purposes.

I claim:—

1. In the extraction of oil and lecithin from oil-bearing seeds rich in lecithin, the herein described improvement which comprises subjecting the untreated seeds, in a comminuted condition to extraction with a composite solvent containing an aromatic hydrocarbon as its largest constituent together with about one to ten per cent of a lower alcohol, and thereafter drying the seed material in a flowing current of gas at not above 70° C.

2. In treating seed material containing oil and lecithin, the step of extracting the same with a composite solvent composed essentially of benzol and a lower alcohol, in the ratio of at least 10:1.

3. In treating seed material containing oil and lecithin, the step of extracting the same with a composite solvent composed essentially of benzol and a lower alcohol, in the ratio of about 20:1.

4. The step of extracting oil from oleaginous seed containing lecithin in both the free and combined state, by treating the same while cold, with a mixture of a single ring aromatic hydrocarbon and a lower alcohol, in the proportions of at least 10:1, which extracting liquid is substantially free from such impurities as would leave permanent odor or taste therefrom in the oil or residue.

5. The step of extracting oil from oleaginous seed by treating the same while cold, and while the proteids therein are in their original readily digestible condition, with a mixture of a single ring aromatic hydrocarbon and a lower alcohol, in the proportions of at least 10:1, which extracting liquid is substantially free from such impurities as would leave permanent odor or taste therefrom in the oil or residue.

6. In treating seed material containing oil and lecithin, the step of extracting the same while the protein content thereof is still in its original readily digestible condition, with a composite solvent composed essentially of benzol and a lower alcohol, in the ratio of at least 10:1.

7. In treating seed material containing oil and lecithin, the step of extracting the same while the protein content thereof is still in its original readily digestible condition, with a composite solvent composed essentially of benzol and a lower alcohol, in the ratio of about 20:1.

In testimony whereof I affix my signature.

BRUNO REWALD.

CERTIFICATE OF CORRECTION.

Patent No. 1,917,734.  July 11, 1933.

BRUNO REWALD.

It is hereby certified that the above numbered patent was erroneously issued to the inventor "Bruno Rewald", whereas said patent should have been issued to Hanseatische Muhlenwerke Aktiengesellschaft, of Hamburg, Germany, a joint stock company of Germany, as assignee of the entire interest in said invention, as shown by the records of assignments in this office; and that the said Letters Patent should be read with this correction therein that the same may conform to the record of the case in the Patent Office.

Signed and sealed this 10th day of December, A. D. 1935.

(Seal)

Leslie Frazer
Acting Commissioner of Patents.

referred to, that is to say the single-ring aromatic hydrocarbon is in all cases at least 10 to 20 times greater than the amount of the lower alcohol.

It will be understood that the solution of oil and lecithin in the composite solvent employed will be subjected to filtration if necessary, and then to distillation to recover the solvent for reuse.

The dried residue of the solid seed material can be directly used in cattle feed, or can be ground up to be used for various other purposes.

I claim:—

1. In the extraction of oil and lecithin from oil-bearing seeds rich in lecithin, the herein described improvement which comprises subjecting the untreated seeds, in a comminuted condition to extraction with a composite solvent containing an aromatic hydrocarbon as its largest constituent together with about one to ten per cent of a lower alcohol, and thereafter drying the seed material in a flowing current of gas at not above 70° C.

2. In treating seed material containing oil and lecithin, the step of extracting the same with a composite solvent composed essentially of benzol and a lower alcohol, in the ratio of at least 10:1.

3. In treating seed material containing oil and lecithin, the step of extracting the same with a composite solvent composed essentially of benzol and a lower alcohol, in the ratio of about 20:1.

4. The step of extracting oil from oleaginous seed containing lecithin in both the free and combined state, by treating the same while cold, with a mixture of a single ring aromatic hydrocarbon and a lower alcohol, in the proportions of at least 10:1, which extracting liquid is substantially free from such impurities as would leave permanent odor or taste therefrom in the oil or residue.

5. The step of extracting oil from oleaginous seed by treating the same while cold, and while the proteids therein are in their original readily digestible condition, with a mixture of a single ring aromatic hydrocarbon and a lower alcohol, in the proportions of at least 10:1, which extracting liquid is substantially free from such impurities as would leave permanent odor or taste therefrom in the oil or residue.

6. In treating seed material containing oil and lecithin, the step of extracting the same while the protein content thereof is still in its original readily digestible condition, with a composite solvent composed essentially of benzol and a lower alcohol, in the ratio of at least 10:1.

7. In treating seed material containing oil and lecithin, the step of extracting the same while the protein content thereof is still in its original readily digestible condition, with a composite solvent composed essentially of benzol and a lower alcohol, in the ratio of about 20:1.

In testimony whereof I affix my signature.
BRUNO REWALD.

CERTIFICATE OF CORRECTION.

Patent No. 1,917,734.                                            July 11, 1933.

BRUNO REWALD.

It is hereby certified that the above numbered patent was erroneously issued to the inventor "Bruno Rewald", whereas said patent should have been issued to Hanseatische Muhlenwerke Aktiengesellschaft, of Hamburg, Germany, a joint stock company of Germany, as assignee of the entire interest in said invention, as shown by the records of assignments in this office; and that the said Letters Patent should be read with this correction therein that the same may conform to the record of the case in the Patent Office.

Signed and sealed this 10th day of December, A. D. 1935.

(Seal)

Leslie Frazer
Acting Commissioner of Patents.

CERTIFICATE OF CORRECTION.

Patent No. 1,917,734.    July 11, 1933.

BRUNO REWALD.

It is hereby certified that the above numbered patent was erroneously issued to the inventor "Bruno Rewald", whereas said patent should have been issued to Hanseatische Muhlenwerke Aktiengesellschaft, of Hamburg, Germany, a joint stock company of Germany, as assignee of the entire interest in said invention, as shown by the records of assignments in this office; and that the said Letters Patent should be read with this correction therein that the same may conform to the record of the case in the Patent Office.

Signed and sealed this 10th day of December, A. D. 1935.

(Seal)

Leslie Frazer
Acting Commissioner of Patents.